(12) United States Patent
Kitzinger et al.

(10) Patent No.: US 11,426,920 B2
(45) Date of Patent: Aug. 30, 2022

(54) APPARATUS FOR TRANSFORMING AND FILLING PLASTICS MATERIAL CONTAINERS WITH CONTROLLED FILLING

(71) Applicant: KRONES AG, Neutraubling (DE)

(72) Inventors: Thomas Kitzinger, Regensburg (DE); Cora Hanesch, Regensburg (DE); Dieter Finger, Neutraubling (DE); Dominik Meier, Parsberg (DE); Andreas Pense, Regensburg (DE); Andreas Vornehm, Offenberg (DE); Christian Betz, Geigant (DE)

(73) Assignee: KRONES AG, Neutraubling (DE)

( * ) Notice: Subject to any disclaimer, the term of this patent is extended or adjusted under 35 U.S.C. 154(b) by 595 days.

(21) Appl. No.: 16/214,893

(22) Filed: Dec. 10, 2018

(65) Prior Publication Data
US 2019/0291329 A1   Sep. 26, 2019

(30) Foreign Application Priority Data

Mar. 23, 2018   (DE) .................... 10 2018 106 930.8

(51) Int. Cl.
*B29C 49/46* (2006.01)
*B29C 49/06* (2006.01)
(Continued)

(52) U.S. Cl.
CPC ............. *B29C 49/46* (2013.01); *B29C 49/06* (2013.01); *B29C 49/58* (2013.01); *B29C 49/783* (2013.01);
(Continued)

(58) Field of Classification Search
None
See application file for complete search history.

(56) References Cited

U.S. PATENT DOCUMENTS 4,484,884 A * 11/1984 Wiatt ................ B29C 49/28
425/534
5,962,039 A * 10/1999 Katou ................ B65B 3/022
222/109
(Continued)

FOREIGN PATENT DOCUMENTS

| CN | 101061338 A | 10/2007 |
|----|-------------|---------|
| CN | 102227301 A | 10/2011 |

(Continued)

OTHER PUBLICATIONS

Chinese Office Action dated Oct. 30, 2020 for Application No. 2018115097845.

*Primary Examiner* — Jacob T Minskey
*Assistant Examiner* — Caroline Beha
(74) *Attorney, Agent, or Firm* — Schmeiser, Olsen & Watts LLP

(57) ABSTRACT

Provided is an apparatus for expanding plastics material parisons into plastics material containers by a liquid medium with at least two transforming stations which fill and expand the plastics material parisons with the liquid medium with at least one common delivery device, which delivers the liquid medium to both transforming stations, wherein the transforming stations in each case have filling devices which fill the liquid medium into the plastics material parisons. According to the embodiments these transforming stations and/or filling devices in each case have a throttle device which are suitable and intended for changing the volume flow of the liquid entering the plastics material parisons.

19 Claims, 2 Drawing Sheets

(51) Int. Cl.
  *B29C 49/78*  (2006.01)
  *B65B 3/02*  (2006.01)
  *B29C 49/58*  (2006.01)
  *B29C 49/12*  (2006.01)
  *B29C 49/36*  (2006.01)
  *B67C 3/26*  (2006.01)
  *B29L 31/00*  (2006.01)

(52) U.S. Cl.
  CPC ............... *B65B 3/022* (2013.01); *B67C 3/26* (2013.01); *B29C 49/12* (2013.01); *B29C 49/36* (2013.01); *B29C 2049/4664* (2013.01); *B29C 2049/5803* (2013.01); *B29C 2049/5858* (2013.01); *B29C 2049/5862* (2013.01); *B29C 2049/5875* (2013.01); *B29L 2031/7158* (2013.01)

(56) References Cited

U.S. PATENT DOCUMENTS

| | | | |
|---|---|---|---|
| 6,214,282 | B1 | 4/2001 | Katou et al. |
| 9,987,787 | B2 | 6/2018 | Lisch et al. |
| 10,696,434 | B2 * | 6/2020 | Haesendonckx ......... B65B 5/02 |
| 2015/0075119 | A1 * | 3/2015 | Chauvin .................. B29C 49/46 |
| | | | 53/453 |
| 2015/0076747 | A1 * | 3/2015 | Winzinger .......... B29C 49/4284 |
| | | | 264/526 |
| 2015/0298828 | A1 | 10/2015 | Klatt et al. |
| 2016/0375625 | A1 * | 12/2016 | Knapp ................ B29C 49/4236 |
| | | | 264/37.16 |
| 2017/0001848 | A1 * | 1/2017 | DiCarlo .................... B67C 3/26 |

FOREIGN PATENT DOCUMENTS

| | | |
|---|---|---|
| DE | 102015016124 A1 | 6/2017 |
| EP | 2987619 A1 | 2/2016 |
| WO | 2003095179 A1 | 11/2003 |
| WO | WO03095179 A1 | 11/2003 |
| WO | 2005044540 A1 | 5/2005 |
| WO | WO2005044540 A1 | 5/2005 |
| WO | 2010003853 A1 | 1/2010 |
| WO | WO2010003853 A1 | 1/2010 |
| WO | 2018141347 A1 | 8/2018 |
| WO | WO2018141347 A1 | 8/2018 |

* cited by examiner

APPARATUS FOR TRANSFORMING AND FILLING PLASTICS MATERIAL CONTAINERS WITH CONTROLLED FILLING

CROSS-REFERENCE TO RELATED APPLICATION

This application claims priority to German Application No. 10 2018 106 930.8, having a filing date of Mar. 23, 2018, the entire contents of which are hereby incorporated by reference.

FIELD OF TECHNOLOGY

The following relates to an apparatus and a method for filling and expanding plastics material containers. It has been known for a long time from the known art that, for conventional production of filled plastics material bottles, usually in a first working step the bottles are shaped from plastics material parisons and then in a second working step they are filled with the product to be bottled. In this respect numerous methods and apparatus are known.

BACKGROUND

In more recent time methods have also become known in which the plastics material bottles are shaped and filled in the same working step. This means that the reshaping of the plastics material parison takes place by the filled product itself. Fundamental patent applications relating to this technology are already known, such as for example WO 03/095179. In this case a moulding station is provided which has a pressure generating unit assigned solely to it, which in turn has a cylinder and a piston driven by compressed air. It is also known to provide the pressure generation in the form of a pump.

In order to increase the ejection rates of systems for producing filled plastics material containers, the process steps are usually parallelised, that is to say the serially heated plastics material parisons are shaped simultaneously in several moulding stations to form containers, which as a rule takes place here directly with the product to be bottled.

In this case it is conceivable that the moulding stations are arranged on a circular path and the entire structure is set in rotation, so that at an entry point the heated plastics material blanks are introduced into the mould and the finally shaped and filled containers are removed at the discharge point.

During the circular movement between the entry point and the discharge point a shaping and filling process takes place on a rotating shaping and filling wheel. In this case it is it is also known from the internal known art to provide an external pressure generation for example on a stationary part of a machine which conveys into a pressure storage or an energy store.

No possibility is disclosed by which volume flows in the direction of the plastics material parisons resulting from the pressure and the cross-sections can be controlled or throttled in any way. In addition, from a safety point of view a flow limiter is advantageous which, in the event of a defective conduit or in the event of similar problems, does not empty the entire content of the pressure storage but malfunctions at an early stage.

SUMMARY

An aspect relates to filling and shaping plastics material parisons to plastics material containers a more variable configuration, and also to make systems with a central pressure medium supply more variable. In addition, however, it should also be easier to take safety aspects into consideration.

An apparatus according to embodiments of the invention for expanding plastics material parisons into plastics material containers by means of a liquid medium and in particular by means of a filling product has at least one transforming station, at least two transforming stations, which fill and expand the plastics material parisons with the liquid medium, and at least one common delivery device which delivers the liquid medium to both transforming stations, wherein the transforming stations in each case have filling devices (or the at least one transforming station has one filling device), which fill the liquid medium into the plastics material parisons.

According to embodiments of the invention these transforming stations and/or filling devices (or the at least one transforming station) in each case have a throttle device which is suitable and intended for changing the volume flow of the liquid entering the plastics material parisons.

It is therefore proposed that a throttling or regulating device is associated with each transforming station and/or each filling device or such a device is provided which enables control of the filling stream of the liquid into the plastics material parisons.

Furthermore, it is preferable to provide not only a common delivery device for delivering the flowable or liquid medium, but also a common pressure generating device, in particular a central product compression. In this case a change of the volume flow is understood to be not only opening or closing of a valve, but also an actual change, for example any change, of a product stream entering the plastics material containers. Furthermore, it is possible that each product stream (to each station) can be adjusted independently and in stages.

In addition, a continuously variable adjustment could also take place, wherein in this case a determined volume flow is recirculated (closed loop). In this case a first measurement variable and a direct measurement variable, such as for example the volume flow and/or the pressure, can be measured. This value is fed back and regulation takes place based on this value.

At the same time or in addition it would also be conceivable that an indirect measurement variable is measured, such as for instance a flow speed or a pressure drop. The volume flow can be calculated with the aid of this value.

In a preferred embodiment the apparatus has a carrier on which the transforming stations are arranged. This carrier is a movable carrier and a rotatable carrier. Therefore, the transforming stations are transported along a circular path. In a further advantageous embodiment, the delivery device has an annular conduit from which the individual transforming stations are supplied. This annular conduit in turn can be supplied from a product reservoir.

In a further advantageous embodiment, the annular conduit can in turn be supplied from a product feed conduit, wherein a pumping device and/or a pressure reservoir is provided. The apparatus advantageously has a central pressure reservoir which serves in order to make the product to be bottled available under pressure.

In a further advantageous embodiment, the transforming stations have holding moulds for holding the plastics material parisons. In this case the plastics material parisons are expanded against inner walls of these transforming stations or holding moulds. Thus, the holding moulds form corresponding negatives starting which correspond to the shape of the plastics material containers or bottles to be expanded.

In a further advantageous embodiment, the transforming stations have rod-like members which can be introduced into the plastics material parisons in order to expand these plastics material parisons in the longitudinal direction. These rods can for example be so-called stretching rods. In a particularly preferred embodiment, the said throttle devices are also suitable for guiding these rod-like members or the movement of these members in the longitudinal direction of the plastics material parisons.

Since due to method-related conditions it is very important to be able to adjust the pressure build-up inside the plastics material parisons in an adjustable time and in the configuration, it is proposed that, before the product enters the plastics material parison, there is a possibility of influencing this pressure build-up at least at times by throttling of the speed and/or reduction of the pressure level. The said throttle device is suitable and intended to change a flow speed and/or a pressure level of the liquid entering the plastics material parison. Thus, for example a filling device or a filling head can be connected to an annular conduit or a pressure storage. The product could enter this head. This filling device rests with one region on the plastics material parison.

In a further advantageous embodiment, the throttle device is suitable and/or intended to change a flow speed and/or a pressure level of the liquid entering the plastics material parison. In this case this throttle device is suitable and/or intended to change this flow speed and/or the pressure level even during the filling operation. In this way it is possible, even during the filling operation, to carry it out with different pressures, for instance first with a lower pressure, then with a higher pressure and finally with a high and constant pressure, in order to stabilise the transformed container.

In a further advantageous embodiment, the filling devices in each case have a valve device which is suitable and intended to control the inflow of the liquid into the plastics material parisons. In this case the valve device can also be the said throttle device, but it would also be possible for additional valve devices to be provided.

In a further advantageous embodiment the filling device has a nozzle element which can be placed onto a mouth of the plastics material parison, and the throttle device has a cover element which is movable relative to the nozzle element, wherein an exit of the liquid from the nozzle element and/or an entry of the liquid into the plastics material parison can be influenced by a movement of the cover element relative to the nozzle element.

Thus, for example a cover element, or a cover element in the form of a sealing stopper, can be provided, by means of which the timing of the product entry into the plastics material parison can be controlled. In this case this nozzle element can be placed sealingly onto the plastics material parison, so that pressure can also be built up. In this case this cover element is particularly constructed as a stopper. This cover element is movable in a longitudinal direction of the plastics material parison. In this way the volume flow into the plastics material parison can be changed more easily. In addition, however, it is also conceivable that such throttling is carried out upstream with respect to the filling device or upstream with respect to the said nozzle element.

In a further advantageous embodiment, the apparatus has a driving device for moving the cover element and/or stopper relative to the filling device and this driving device is an electrically or (electro)magnetically operated driving device. In this case the cover element or the sealing stopper can be moved in particular by means of a servomotor and/or an electromagnet. In this case this cover element can approach to any position between two predetermined end positions and in this way can change the flow volume or the flow rate in a continuously variable manner.

However, a drive in the form of a cam control and/or a pneumatic and/or hydraulic drive can also be provided.

In a preferred embodiment the apparatus has a position detecting device which is suitable and intended for detecting a geometric position and/or path of the cover element relative to the nozzle element. This can be a path measuring system, for example a LVDT (linear variable differential transformer), an optical path measuring system or an inductive path measuring system. In this case this path measuring system serves to control the drive means and so any positions can be approached and thus the volume flow of the product can also be throttled as required.

Control and regulation of the position of the cover element also takes place depending on a desired flow of the liquid.

Alternatively, it would also be possible that this throttling already takes place before the product enters the filling head or the filling device. In addition, other types of throttle could also be used, such as for example vortex-type throttles or vortex-type diaphragms. In this case such diaphragms could be manually replaceable, or also manually adjustable. In addition, pressure-regulated throttles or similar throttles could also be used, regardless of whether they are used before or after a pressure storage (preferred).

The covering device or a sealing stopper is understood below to be in particular the device for throttling the product stream, but this does not necessarily have to take place firstly in the filling device but can already be implemented in the annular channel in particular by means of a separate throttle.

In a further advantageous embodiment, the apparatus has a first sensor device which detects a measured value which is characteristic for the through flow of the liquid through the filling device. In this case this sensor device detects a characteristic measured value for a flow cross-section and/or a flow rate.

In a preferred embodiment this sensor device has at least one pressure measuring device. The apparatus has a first and a second pressure measuring device, which are arranged at different locations with respect to the product stream, in order thus to determine a differential pressure.

In a further advantageous embodiment, the cover element has an external contour configured in such a way that in a predetermined working range of the cover element there is a substantially linear relationship between a position of the cover element and the flow of the liquid through the filling device (at constant differential pressure). In this way at least in this working range a linear control of the flow depending on the valve or throttle position can be achieved.

Particularly, the design of the cover element or sealing stopper is such that the pressure-effecting surface on the rear side of the cover element is optimised in such a way that for the required valve dynamics no unrealistically large actuators are required, but the pressure of the medium can nevertheless close the valve.

In a preferred embodiment the sealing stopper is designed in such a way that it does not encourage droplet formation. This could for instance be achieved by a droplet-shaped, spherical or elliptical sealing stopper.

The surface can also be configured in such a way that, as the product flows past, no turbulence or major effect on the flow behaviour occurs. On the other hand, by the design cover element it could also be possible to give the product flow a swirling motion or a constant flow rate. Centring of the stretching rod would also be possible as an objective of the cover element.

For centring of the stretching rod, however, a separate component could also be used which is designated below as a diffuser. This diffuser advantageously effects a distribution of the liquid in a peripheral direction of the filling device, a peripheral direction relative to the longitudinal direction of the plastics material parisons to be expanded.

In addition, the cover element or the throttle device of the volume flow could have a contour which in a relevant working range of the throttle device has, as far as possible, a linear or quadratic relationship between the valve position and the through flow, or at least has a function which allows a linearisation in the context of a closed loop control. However, for this purpose another component could also be used along the flow of the product.

In a further configuration, dead paths are avoided and for example an advancing movement (a movement without reaction) is already carried out before the actual valve function.

In addition, it would also be conceivable to implement a flow measurement with the throttle device. Thus, for example, as explained more precisely below, a measurement of the differential pressure between the input side and the output side of the throttle device or of a sealing stopper could be implemented or also such a pressure difference could be measured on a geometrically specific geometry at a specific location in the filling device and/or the annular channel or the feed conduit. In this way the volume flow could be measured. Thus, however, the values which are relevant for the process, pressure and/or volume flow on the one hand and values of a control loop on the other hand, can also be made available to the operator.

In a further advantageous embodiment, the sealing stopper or the cover element has on its rear side shape which is optimised in such a way that the required valve dynamics do not require unrealistically large actuators, but nevertheless the pressure of the medium can close the valve. This means that although this surface is greater than zero, it is nevertheless small. A pressure could generally also be determined by means of the equation $P1=F_{drive}/A_{cover\ element}$.

In a further advantageous embodiment, for adjustment of the volume flow the throttle device is arranged after a pressure storage device, regardless of whether these are mounted on the fixed apparatus part or on the rotating apparatus part, in order to prevent errors, for example pressure fluctuations, in switching off of a station or the like. In a further advantageous embodiment, the apparatus has at least one and several flow limiters. By leakages with pressure storages, the effect of these flow limiters can be that not the entire pressure storage is emptied, but such emptying is even prevented. In this case such flow limiters can shut off the infeed after a specific amount has been dispensed. This could also be carried out by means of a software-based solution, wherein the pressure profile is observed during shaping of the containers and leaks in the system or in the bottle are inferred from characteristic features of the pressure profile.

Furthermore, it would be possible that the pressure control in the system is achieved by means of an actively and quickly controllable pump, for example an axial piston pump, which increases or reduces the amount conveyed according to the required pressure difference to the target pressure.

Another possibility would consist of implementing the pressure control by means of a constant pump output and/or amount conveyed. In addition, by means of a bypass and/or a pressure regulating valve the required amount conveyed can be fed in or dispensed. This would be less advantageous from the energy point of view, but could offer advantages with regard to pressure fluctuations or speed of the system.

In a further advantageous embodiment, a bypass or a return line could be installed in a tank or the like in any case, in order in an emergency situation to have the entire system pressureless and, furthermore, already existing components could be used in order to integrate the pressure control.

In addition, or alternatively it would also be conceivable that regulation takes place by means of the volume flow, that is to say the volume flow is the control variable. By means of a return line into a reservoir such as the tank it is possible to draw off an excess volume flow.

Also, a pressure control could take place by means of an altered valve switching and a thereby altered amount conveyed by a piston pump (or injection pumps).

In a further advantageous embodiment, the apparatus has a pressure regulating device which serves to regulate the pressure of the liquid medium to be filled into the plastics material parison. In this case this pressure regulating device could be designed for example as a controllable pump or as a controllable bypass.

As mentioned above, the apparatus has a pressure storage for the liquid medium to be bottled. In this case this pressure storage device could be located at different positions. Thus, the pressure storage device could be located on the stationary apparatus part and could feed into a pressure ring distributor. For this purpose, controllable valves and electrically controllable valves to the individual filling devices could be provided. It would also be possible and potentially expedient to use several annular channels and pumps in order to meet different requirements, such as speed and pressure level.

In a further configuration it would also be possible, in addition to a completely central arrangement of the pressure generation, to place these components entirely or at least partially on a moving and rotating part. This means that the compression of the product can be provided for example centrally on a stationary apparatus part or also decentrally on a rotating part or also in multiple stages on both parts.

In addition, it would also be conceivable for an individual pressure storage or several pressure storages to be arranged on the fixed or moving or rotating parts or on both parts of the apparatus. The pressure storage or storages can be constructed jointly on the rotating part for all transforming stations, or however also individually for each individual moulding station.

In a further advantageous embodiment an entire or partial decentralisation of the said components is carried out. In this way it is possible that the pressure ring distributor does not have to transfer a pressurised medium. In addition, the lengths of conduits between the pressure generation and the moulding of the container is reduced, which has a positive effect on the pressures and flow rates which can be achieved. The proposed embodiments offer the advantage that system costs are potentially lower by comparison with previous designs.

On the other hand, the centralisation of the pressure generation offers the advantage that a pumping device operates at a working point and can also be optimised for this. This results in fewer unused system resources.

Furthermore, it is possible that rotating masses and installation space on the shaping and filling wheel are reduced to a minimum. In this way the energy consumption can be decreased, also a necessary braking power can be reduced, and the accessibility can be improved overall.

In addition, it is also possible that flow rates are limited substantially by conduit resistances and a pressure regulating valve. This offers considerable potential for influencing the process parameters in a larger range.

In addition, a system for all container sizes is made available, wherein only a small resource overhead occurs. In addition, it is also possible to significantly reduce or even omit the necessary power for moulding of the container on the rotating part.

Furthermore, embodiments of the present invention is directed to a method for expanding plastics material parisons into plastics material containers by means of a liquid medium, wherein with at least one and with at least two transforming stations the plastics material parisons are filled and expanded with the liquid medium, and wherein with at least one common delivery device the liquid medium is delivered to the at least one and both transforming stations, and the transforming stations in each case have filling devices (or the at least one transforming station has one filling device), which introduce/introduces the liquid medium into the plastics material parisons.

According to embodiments of the invention these transforming stations and/or filling devices in each case have a throttle device which at least at times change the volume flow of the liquid entering the plastics material parisons.

It is therefore also proposed by the method that a throttling or control of the liquid medium to be delivered to the plastics material parisons (individually for the individual transforming stations) is carried out.

BRIEF DESCRIPTION

Some of the embodiments will be described in detail, with reference to the following figures, wherein like designations denote like members, wherein.

DETAILED DESCRIPTION

Figure 1:
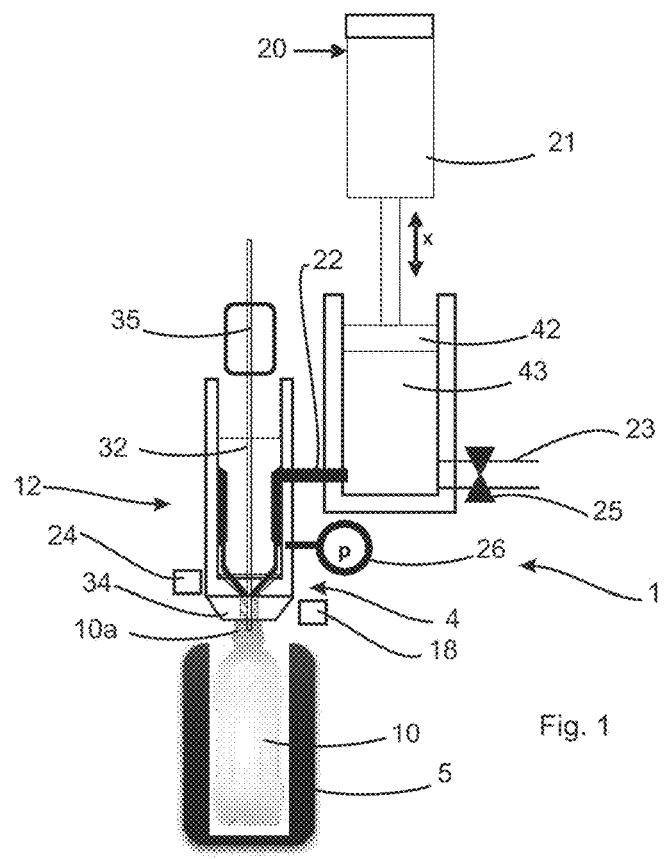
FIG. 1 shows a schematic representation of the filling and expansion of the containers by means of the filling product.

FIG. 1 shows a representation of an apparatus for expanding containers 10. In this case the apparatus has a driving device designated by 20, which serves to generate a movement of a piston device 42 in the X direction. This may for example be a linear motor which has a path length measuring device 21 (only shown schematically). A piston device 42 is moved relative to a piston chamber 43 by means of this driving device 20. In this way it is possible for a liquid medium M, such as in particular the liquid to be bottled, to be transported to the container 10.

The reference numeral 23 designates a product feed conduit, wherein the feed conduit can be shut off by means of a valve 25. The liquid is conveyed into a filling device designated as a whole by 12. This filling device 12 has a contact element 34 which can be placed on a mouth 10a of the plastics material containers. The reference numeral 32 designates a stretching rod which can be introduced into the interior of the plastics material container 10, in order to expand it in its longitudinal direction. The reference numeral 35 designates a corresponding stretching rod drive. The reference numeral 22 designates a connecting conduit between the piston chamber 43 and the filling device. The reference numeral 24 designates quite schematically a pressure regulating device.

The reference numeral 4 designates schematically a throttle device which is suitable and intended for controlling the inflow of the medium into the plastics material container 10. The reference numeral 26 designates a pressure measuring device.

The plastics material container 10 is expanded inside a transforming mould 5 and so the operation leads to the finished transformed and filled container.

Figures 2, 3:
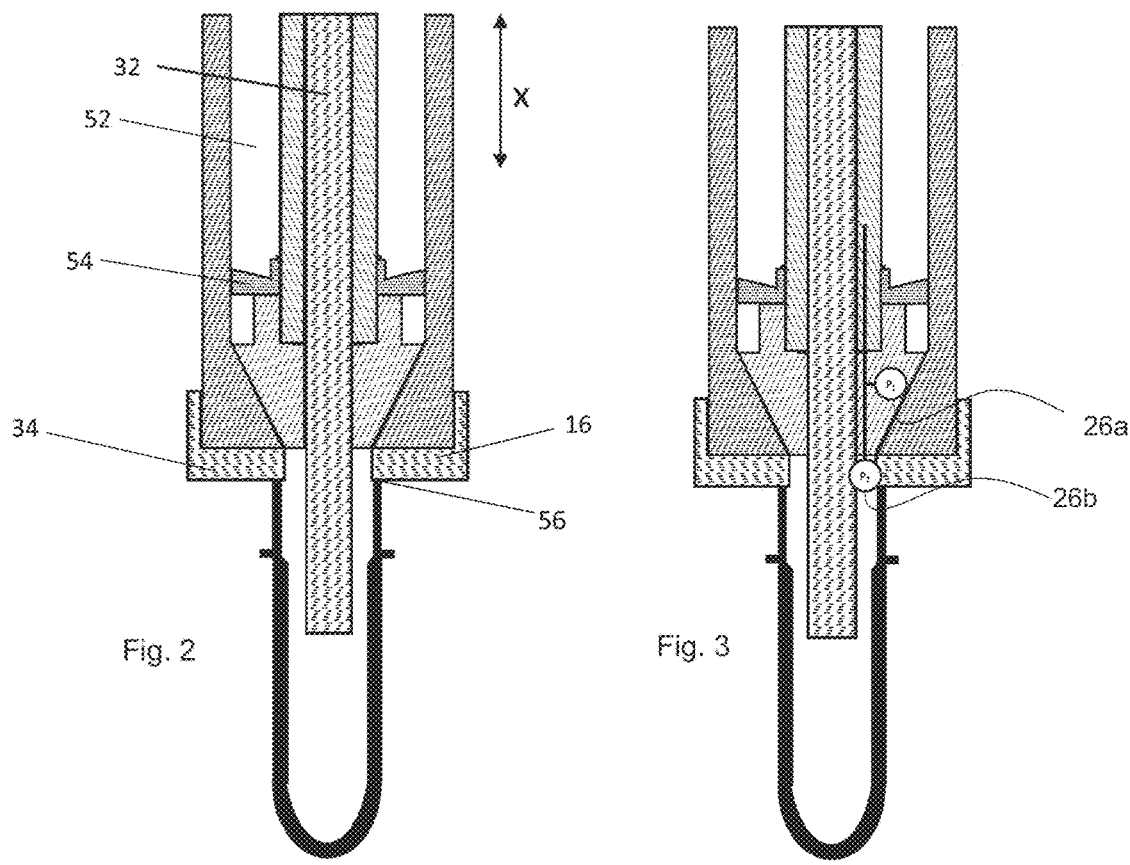
FIG. 2 shows a view of a detail of a filling device.
FIG. 3 shows a further representation of a filling device.

FIG. 2 shows a detail of the filling device. In this case the reference numeral 52 relates to a piston rod which is suitable and intended for moving a cover element, designated as a whole by 16, upwards and downwards in the X direction. This piston rod in turn can be driven by an electrical drive. Furthermore, it is possible that the stretching rod 32 designated above is guided inside this piston rod.

The reference numeral 54 designates a diffuser device which is suitable and intended to uniformly distribute the flowable medium to be filled (in the peripheral direction relative to the longitudinal direction of the plastics material parison). The reference numeral 34 designates a nozzle element, which as shown above can be placed onto the mouth of the container. In this case the reference numeral 56 designates more precisely the sealing region between this nozzle element 34 and the preform or the plastics material container which is produced therefrom. The nozzle element here is also the above-mentioned contact element. The reference numeral 18 designates quite schematically a detection device which detects a location of the contact element or of the nozzle element and a position in the longitudinal direction of the container to be expanded.

FIG. 3 shows a further representation of a detail of the filling device. In this case two pressure measuring devices 26a and 26b (which measure the pressures P1 and P2) are illustrated. These serve in order to determine the differential pressure between an outlet region of the liquid medium (P2) and the region inside the filling device (P1). With the aid of this pressure difference it is possible to fix the flow rate in the plastics material parison.

Figure 4:
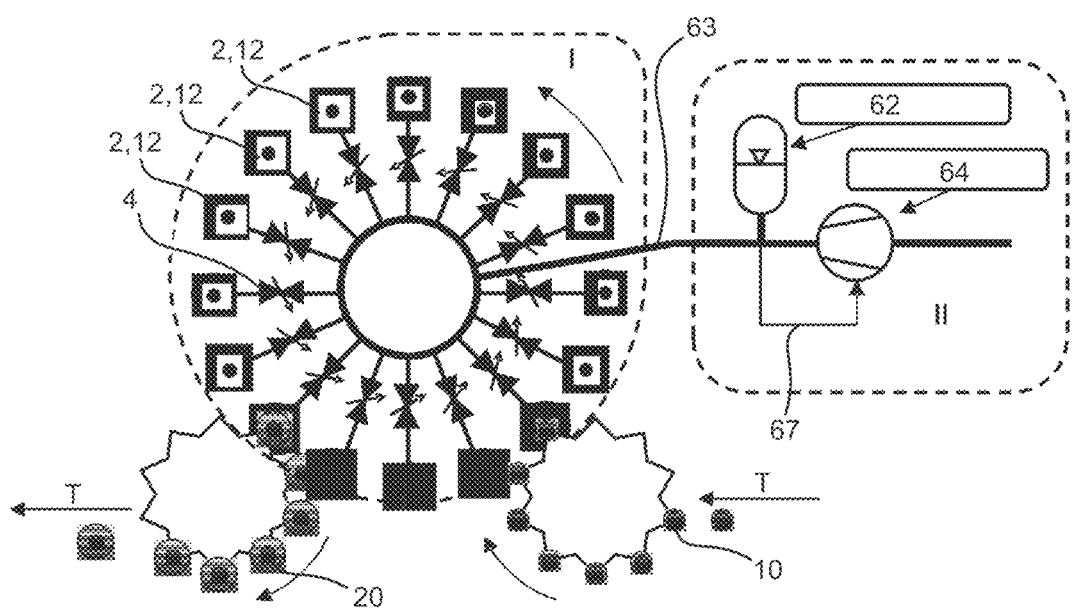
FIG. 4 shows a representation of a first system concept for filling of plastics material containers.

FIG. 4 shows a first possible system concept. In this embodiment a pressure generating device such as a pump 64 is arranged on a stationary part of the system. In any case a pressure storage device 62 is located in the stationary part II of the system. By means of a conduit 63 the flowable medium is conveyed to a reservoir or also to an annular channel 6 on the rotating part I of the system. A plurality of transforming stations 2 and filling devices 12 are supplied starting from the annular channel 6. In this case these transforming stations 2 are simultaneously also the filling devices 12.

The reference numerals 4 in each case designate schematically depicted throttle devices which control the delivery of the liquid to the containers. The plastics material parisons 10 are delivered along the transport path T and are filled in the system and simultaneously transformed into plastics material containers 20, in order then to be able to be discharged.

Figure 5:
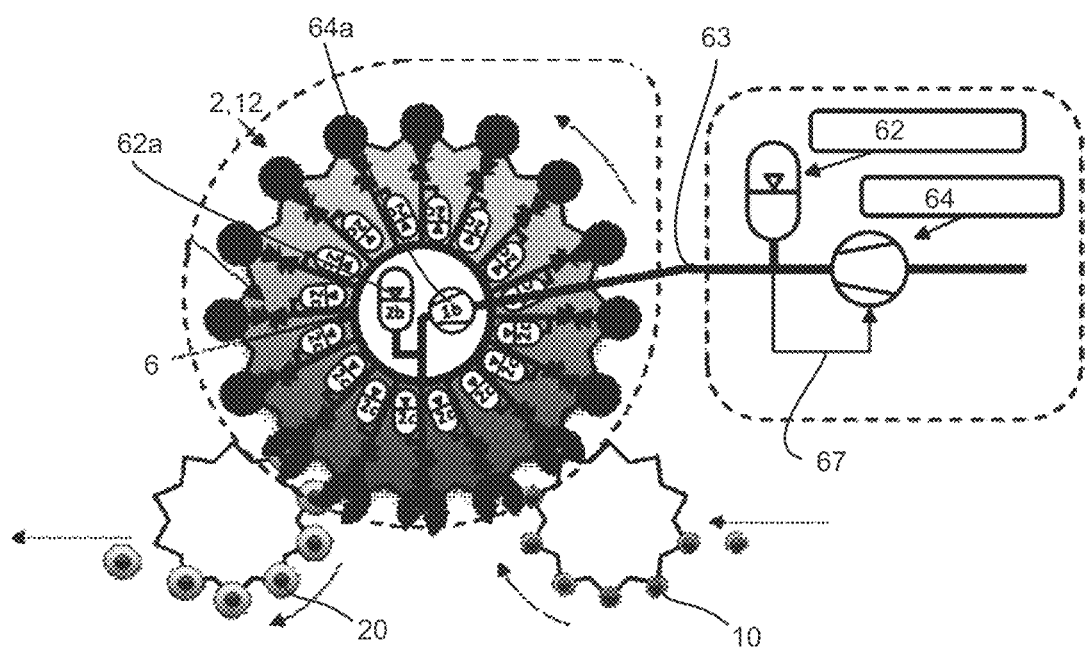
FIG. 5 shows a further representation of a filling concept for plastics material containers.

FIG. 5 shows a further embodiment of a system concept. Here too the pumping device 64 and the pressure storage device 62 are arranged on the stationary part. In addition, a feedback device 67 can also be provided which enables automatic regulation of the pump output depending on process variables. Such process variables can be for example the volume flow or the pressure.

In the variant shown in FIG. 5 it would also be possible to install the pumping device and/or the pressure storage directly on the rotating part of the system. In addition, it would be possible, as shown more precisely in FIG. 5, to install both a pumping device 64 and a pressure storage device 62 on the stationary part and additionally to install corresponding pumping devices 64a and pressure storage devices 62a on the rotating part of the system. Alternatively, or additionally, further pressure storage devices can also be provided, which are assigned to the individual transforming stations and/or filling devices.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

LIST OF REFERENCES 1 apparatus
2 transforming station
4 throttle device
5 transforming mould
6 annular channel
10 containers
12 filling device
12 filling device
16 cover element
18 position detecting device
20 driving device
21 path length measuring device
23 product feed conduit
24 pressure regulating device
25 valve
26 pressure measuring device
32 stretching rod
34 contact element, nozzle element
35 stretching rod drive
42 piston device
43 piston chamber
52 piston rod
54 diffuser device
56 sealing region
62 pressure storage device
63 conduit
64 pumping device
67 feedback device
10a mouth of the plastics material containers
62a pressure storage device
64a pumping device
M liquid medium
P1 pressure measuring device
P2 pressure measuring device
T transport path

The invention claimed is:

1. An apparatus for expanding plastics material parisons into plastics material containers by a liquid medium, with at least one transforming station which fills and expands the plastics material parisons with the liquid medium, with at least one common delivery device which delivers the liquid medium to the at least one transforming station, wherein the at least one transforming station has a filling device which fills the liquid medium into the plastics material parisons, wherein the at least one transforming station and/or the filling device has a throttle device which is suitable and intended for changing the volume flow of the liquid entering the plastics material parisons, and wherein the apparatus has a first sensor device which detects a measured value which is characteristic for the through flow of the liquid through the filling device, wherein the characteristic measured value is a characteristic measured value for a flow cross-section and/or a flow rate, wherein changing the volume flow includes an actual change to the product stream entering the plastics material parisons, wherein the change to the product stream entering the plastics material parisons is achieved by the throttle device having a cover element, wherein an entry of the liquid medium into the plastics material parison can be influenced by a movement of the cover element and the cover element can move to any position between two predetermined end positions to change the flow volume and/or the flow rate in a continuously variable manner.

2. The apparatus according to claim 1, wherein the throttle device is suitable to change a flow speed and/or a pressure level of the liquid entering the plastics material parison.

3. The apparatus according to claim 1, wherein the filling device in each case have a valve device which are suitable and intended to control the inflow of the liquid into the plastics material parisons.

4. The apparatus according to claim 1, wherein the filling device has a nozzle element which can be placed onto a mouth of the plastics material parison, wherein an exit of the liquid medium from the nozzle element can be influenced by a movement of the cover element relative to the nozzle element.

5. The apparatus according to claim 4, wherein the apparatus has a driving device for movement of the cover element relative to the nozzle element and this driving device is an electrically and/or electromagnetically operated driving device.

6. The apparatus according to claim 4, wherein the apparatus has a position detecting device which suitable and intended to at least indirectly detect a geometric position of the cover element relative to the nozzle element.

7. The apparatus according to claim 4, wherein the cover element has an external contour configured in such a way that in a predetermined working range of the cover element there is a substantially linear relationship between a position of the cover element and the flow of the liquid through the filling device.

8. The apparatus according to claim 4, wherein the nozzle element can be placed sealingly onto the plastics material parison, so that pressure can also be built up, and the cover element is movable in a longitudinal direction of the plastics material parison.

9. The apparatus according to claim 1, wherein the first sensor device has at least one pressure measuring device.

10. The apparatus according to claim 1, wherein the apparatus has a pressure regulating device for regulating a pressure of the liquid medium to be introduced into the plastics material parison.

11. The apparatus according to claim 1, wherein the at least one transforming station has a rod-like member which can be introduced into the plastics material parisons in order to expand these plastics material parisons in the longitudinal direction, wherein the throttle device is also suitable for guiding the rod-like member or the movement of the rod-like member in the longitudinal direction of the plastics material parisons.

12. The apparatus according to claim 1, wherein a flow measurement is implemented with the throttle device, wherein a measurement of a differential pressure between an input side and an output side of the throttle device is carried out.

13. The apparatus according to claim 1, wherein the apparatus has a central pressure reservoir which serves in order to make the liquid medium to be bottled available under pressure.

14. The apparatus according to claim 1, wherein the throttle device is suitable and/or intended to change a flow speed and/or a pressure level even during the filling operation.

15. A method for expanding plastics material parisons into plastics material containers by a liquid medium, wherein with at least one transforming station the plastics material parisons are filled and expanded with the liquid medium, and wherein with at least one common delivery device the liquid medium is delivered to the at least one transforming station and the at least one transforming station has a filling device which fills the liquid medium into the plastics material parisons, wherein the at least one transforming station and/or the filling device in each case has a throttle device which at least at times changes the volume flow of the liquid entering the plastics material parisons, and wherein the apparatus has a first sensor device which detects a measured value which is characteristic for the through flow of the liquid through the filling device, wherein the characteristic measured value is a characteristic measured value for a flow cross-section and/or a flow rate, wherein changing the volume flow includes an actual change to the product stream entering the plastics material parisons, wherein the change to the product stream entering the plastics material parisons is achieved by the throttle device having a cover element, wherein an entry of the liquid medium into the plastics material parison can be influenced by a movement of the cover element and the cover element can move to any position between two predetermined end positions to change the flow volume and/or the flow rate in a continuously variable manner.

16. The method according to claim 15, wherein a pressure regulation takes place by an active or quickly controllable pump.

17. The method according to claim 15, wherein a pressure regulation takes place by a substantially constant pump output and/or a substantially constant amount conveyed.

18. The method according to claim 15, wherein a delivery or discharge of an amount conveyed takes place, and this delivery or discharge takes place by a bypass and/or a pressure regulating valve.

19. The method according to claim 15, wherein a return of the liquid into a reservoir takes place at least at times.

* * * * *